United States Patent
Homer et al.

(10) Patent No.: US 6,671,171 B1
(45) Date of Patent: Dec. 30, 2003

(54) PORTABLE ELECTRONIC DEVICE HAVING CHASSIS REINFORCEMENT SYSTEM

(75) Inventors: Steve S. Homer, Tomball, TX (US); Mitchell A. Markow, Spring, TX (US); David E. Gough, Richmond, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 188 days.

(21) Appl. No.: 09/717,830

(22) Filed: Nov. 21, 2000

(51) Int. Cl.[7] .................................................. G06F 1/16
(52) U.S. Cl. ....................... 361/683; D14/106; 381/388
(58) Field of Search ................................ 361/683, 686, 361/724–727; D14/106, 107; 381/306, 337, 388

(56) References Cited

U.S. PATENT DOCUMENTS

| | | | | |
|---|---|---|---|---|
| 4,998,283 A | * | 3/1991 | Nishida et al. ............. 381/333 |
| 5,115,884 A | * | 5/1992 | Falco ......................... 381/386 |
| 5,610,992 A | | 3/1997 | Hickman ..................... 381/188 |
| 5,646,820 A | * | 7/1997 | Honda et al. ................ 361/683 |
| 5,668,882 A | | 9/1997 | Hickman et al. .............. 381/24 |
| 5,682,290 A | | 10/1997 | Markow et al. ............. 361/683 |
| 5,761,322 A | * | 6/1998 | Illingworth et al. ........ 381/336 |
| 5,808,861 A | * | 9/1998 | Nakajima et al. ........... 361/680 |
| 5,847,922 A | * | 12/1998 | Smith et al. ................ 361/683 |
| 5,920,637 A | * | 7/1999 | Jeon .......................... 361/682 |
| 6,061,460 A | * | 5/2000 | Seo ............................ 381/388 |
| 6,134,104 A | * | 10/2000 | Mohi et al. ................. 361/683 |
| 6,148,243 A | * | 11/2000 | Ishii et al. .................. 361/683 |
| 6,219,430 B1 | * | 4/2001 | Chien ......................... 381/388 |
| 6,243,260 B1 | * | 6/2001 | Lundgren et al. ........... 361/683 |
| 6,522,763 B2 | * | 2/2003 | Burleson et al. ............ 361/683 |

* cited by examiner

Primary Examiner—Lisa Lea-Edmonds

(57) ABSTRACT

A portable electronic device having a rigid chassis. The portable electronic device utilizes a reinforcement structure within the chassis. The structure is designed for application in a space constrained area by incorporating one or more speaker mounts and speakers for audio output.

23 Claims, 3 Drawing Sheets

PORTABLE ELECTRONIC DEVICE HAVING CHASSIS REINFORCEMENT SYSTEM

FIELD OF THE INVENTION

The present invention relates generally to electronic devices, such as computers, and particularly to portable electronic devices, such as portable computers.

BACKGROUND OF THE INVENTION

A variety of portable, electronic devices are used for performing various tasks. An exemplary device includes a chassis, a processor disposed within the chassis, a display, an input device (e.g. a keyboard) and an audio output device, such as a speaker or speakers. The electronic device can take the form of a portable computer, DVD player, Internet access device or other devices.

There has been a trend towards making such devices smaller and thinner to make such devices more readily portable. However, as such devices get thinner and/or more complex, there is decreased room for mechanical support of the overall chassis. Additionally, some of these devices, such as notebook computers, have a plurality of openings for "multibays" that add to the structural problems.

SUMMARY OF THE INVENTION

According to one aspect of the present invention, a portable computer is provided with increased structural stiffness. The portable computer comprises a chassis and a keyboard connected to the chassis. The computer also includes a speaker box and a speaker coupled to the speaker box. The speaker box is designed as a structural support member connected to the chassis.

According to another aspect of the present invention, a portable electronic device structure is provided. The electronic device structure comprises a chassis having a front, a rear, a first side extending between the front and the rear and a second side extending between the front and rear. A reinforcement structure is coupled to the chassis such that it extends at least partially between the first side and the second side to provide added structural rigidity. Additionally, a speaker is mounted to the reinforcement structure.

According to another aspect of the present invention, a method is provided for reinforcing a portable computer having a chassis. The method comprises combining a speaker with a structural reinforcement member. The method further includes connecting the structural -reinforcement member along the chassis to stiffen the chassis.

BRIEF DESCRIPTION OF THE DRAWINGS

The invention will hereafter be described with reference to the accompanying drawings, wherein like reference numerals denote like elements, and.

DETAILED DESCRIPTION OF EXEMPLARY EMBODIMENTS

Figure 1:
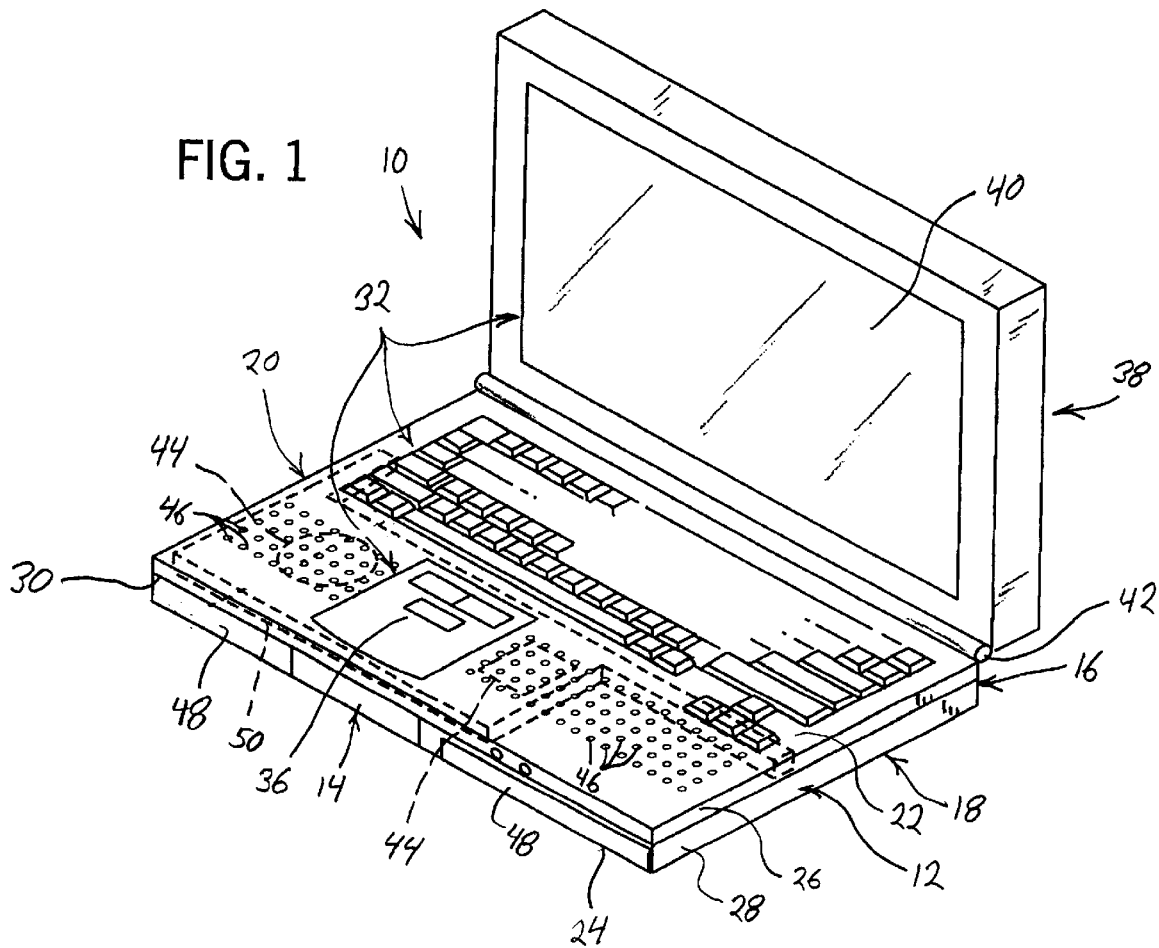
FIG. 1 is a perspective view of an exemplary portable, electronic device, according to one embodiment of the present invention.

Referring generally to FIG. 1, an exemplary electronic device 10 is illustrated. In this example, electronic device 10 comprises a portable computer, such as a notebook computer, but device 10 can comprise a variety of other types of portable, electronic devices.

In the illustrated embodiment, device 10 includes a chassis 12 having a front 14, a rear 16 and a pair of sides 18, 20 that extend generally between front 14 and rear 16. Chassis 12 also includes an upper wall 22 and a lower or base wall 24. Upper wall 22 forms part of a top or upper case 26 that is joined to a bottom or lower case 28 along a seam 30. Lower case 28 includes base wall 24.

In addition to chassis 12, the exemplary device 10 comprises a processor 31 and a user interface 32 through which a user may input instructions or information. Exemplary user interfaces 32 include a keyboard 34 and/or cursor control buttons 36. However, a variety of other user interfaces may be utilized depending on the design and application of electronic device 10.

Often, electronic device 10 also includes a display 38 for displaying information. In this embodiment, display 38 comprises a flip-up screen 40 connected to chassis 12 by a hinge 42. Hinge 42 is disposed generally at rear 16 of chassis 12.

Electronic device 10 also includes one or more audio output devices, such as a speaker or speakers 44. In the illustrated embodiment, a pair of speakers 44 are disposed beneath upper wall 22 of upper case 26 and positioned to output sound through openings 46 formed in upper wall 22. Speakers 44 are disposed generally between keyboard 34 and front 14 of chassis 12.

One or more bays 48 also may be incorporated into the design of electronic device 10. Typically, the one or more bays 48 are disposed towards the front of chassis 12 for receipt of an appropriate drive through front 14. Each bay 48 may be designed for a desired drive, e.g. a CD-ROM drive, appropriate for the specific application of electronic device 10.

Figure 2:
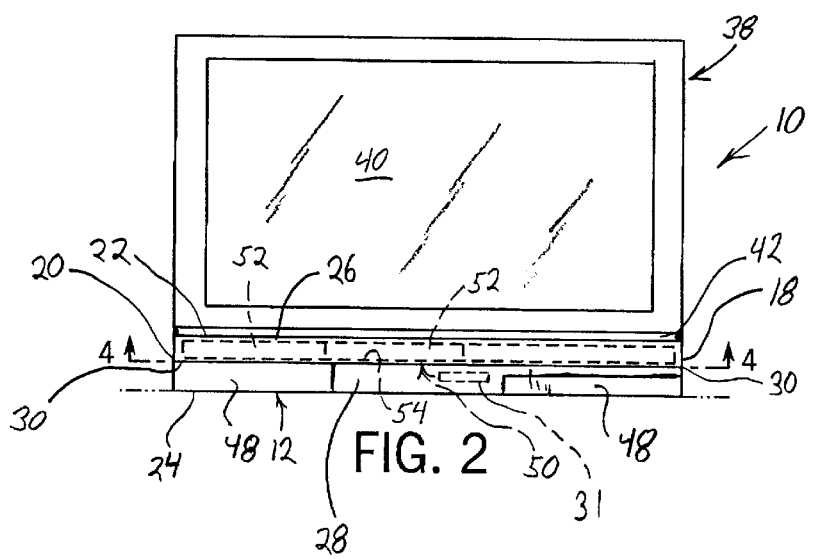
FIG. 2 is a front view of the device illustrated in FIG. 1.

Referring also to FIG. 2, the speaker or speakers 44 are disposed in a speaker box 50. An exemplary speaker box 50 comprises speaker mounting areas 52 (see also FIG. 3) for receiving speakers 44 and a structural support or reinforcement member 54. Structural support member 54 helps conserve space within a relatively small portable chassis 12 by accommodating speaker positioning while providing substantially increased structural stiffness for the overall chassis.

Figure 3:
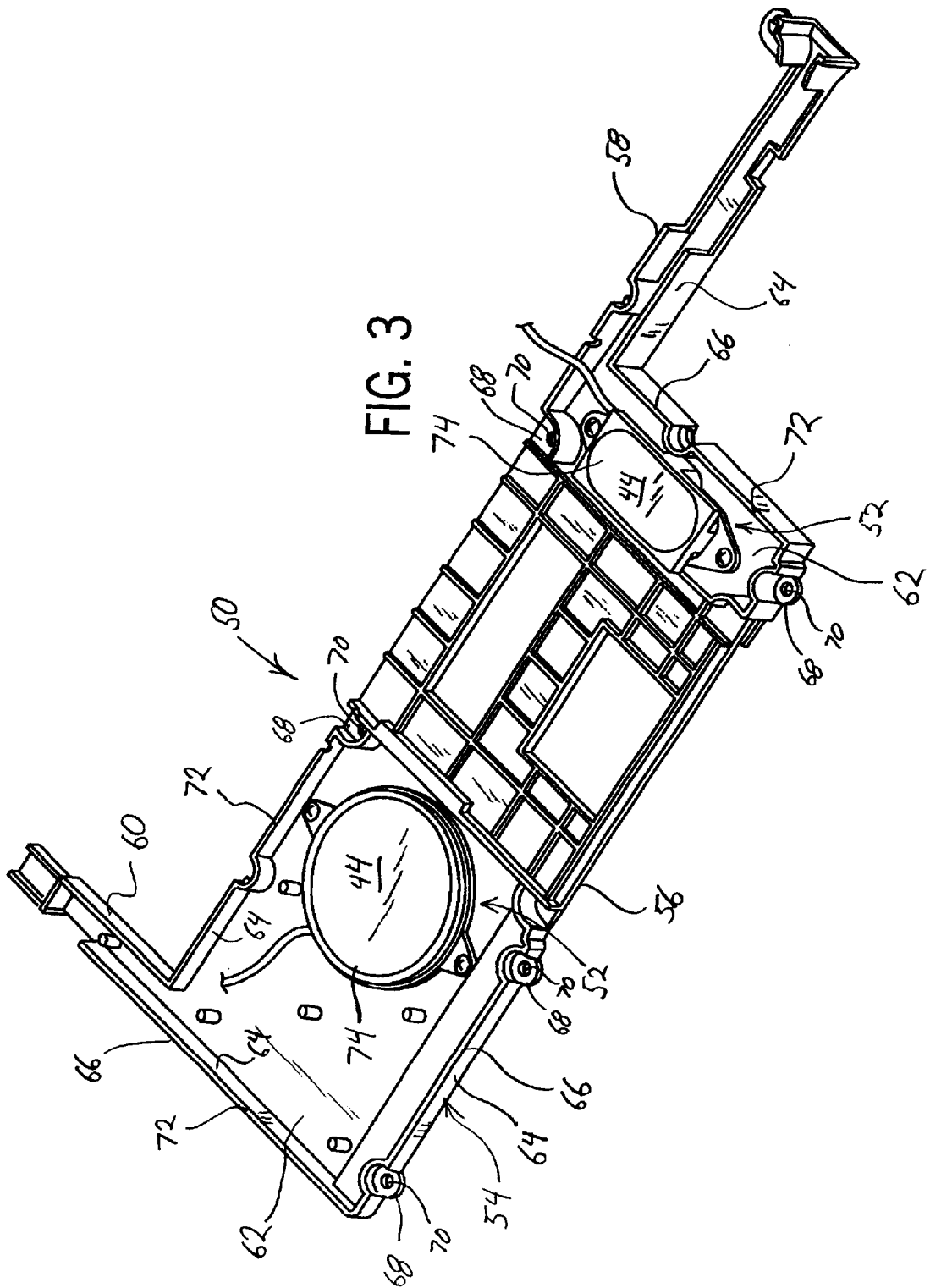
FIG. 3 is a perspective view of a reinforcement member used to reinforce the chassis-of an electronic device, such as the device illustrated in FIG. 1.
Figure 4:
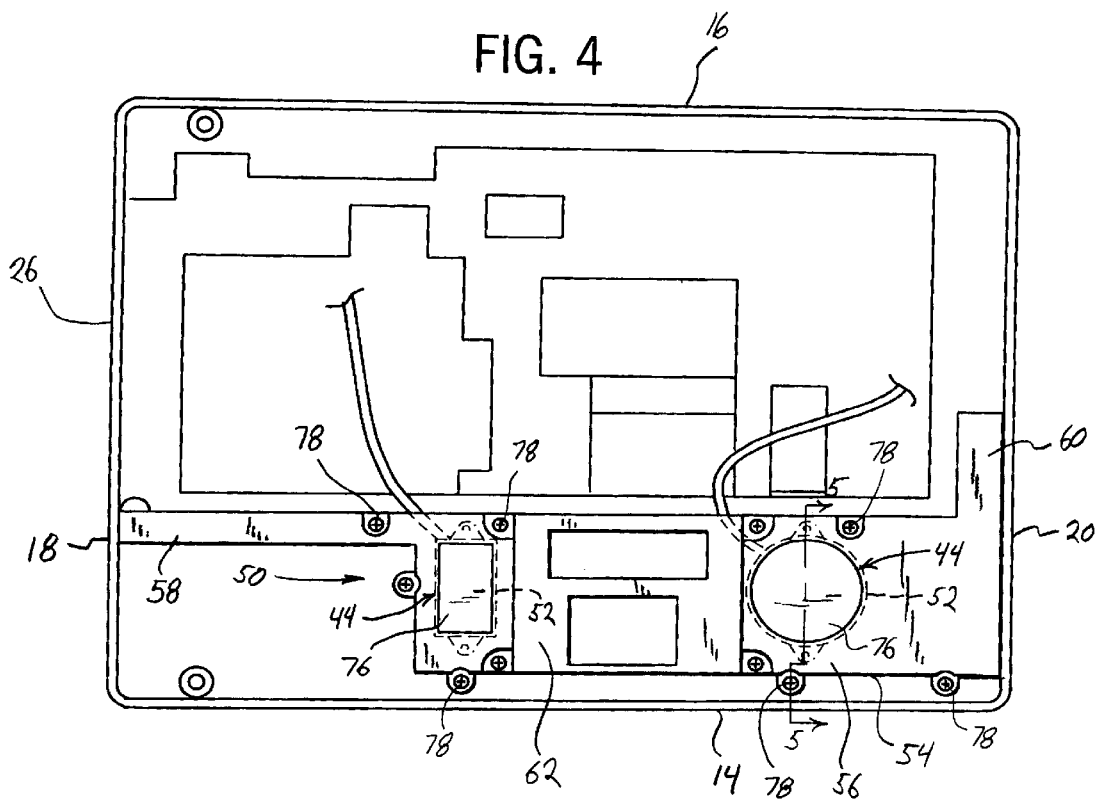
FIG. 4 is-a partial cross-sectional view taken generally along line 4—4 of FIG. 2.

Referring also to FIGS. 3 and 4, structural support member 54 is attached to chassis 12 and extends at least partially across the chassis. For example, in the illustrated embodiment, support member 54 extends from side 18 to side 20 within the interior of chassis 12. In this embodiment, structural support member 54 is attached to upper case 26 along the interior surface of upper wall 22. Also, the support member is located intermediate keyboard 34 and front 14 of chassis 12. By combining structural support member 54 with speaker mounting areas 52, an efficient use of space is accomplished while stiffening the relatively thin chassis 12.

An exemplary speaker box 50 and structural support member 54 is illustrated in FIG. 3. The exemplary structural support member 54 is formed of a relatively stiff material, such as a variety of moldable plastic materials, commonly used in the computer industry.

In the example illustrated, structural support member 54 includes a main body portion 56 having, for example, a pair of speaker mounting areas 52 for receiving speakers 44. The exemplary support member 54 also includes an extended arm 58 that extends from main body portion 56 towards side 18 of chassis 12. Additionally, another support arm 60 extends from main body portion 56 in a direction generally perpendicular to extended arm 58 along side 20 of chassis 12.

Although support member 54 may be formed in a variety of configurations, the illustrated embodiment includes a generally planar support wall 62 to which speakers 44 are mounted. A reinforcement wall 64 extends from planar support wall 62 in a direction generally perpendicular to planar support wall 62. Reinforcement wall 64 provides support member 54 with greater strength and rigidity. Additionally, reinforcement wall 64 includes an edge 66 designed to abut against the inside surface of upper wall 22, as further illustrated in FIGS. 4 and 5. Support member 54 also may include a plurality of fastener supports 68. One type of appropriate fastener support includes an aperture 70 for receiving a fastener, such as a threaded fastener, therethrough.

One way of attaching speaker box 50 to chassis 12 is to securely attach structural support member 54 to upper case 26. In the illustrated embodiment, structural support member 54 is adhered to the inside surface of upper wall 22 by an appropriate adhesive 72. Adhesive 72 is applied along edge 66, and edge 66.is abutted against the inside surface of wall 22 in a location such that the audio output ends 74 of speakers 44 are directed towards openings 46 formed through chassis 12, asbest illustrated in FIGS. 3 and 5. Thus, the bases 76 of speakers 44 are positioned generally at or through planar support wall 62 of structural support member 54, as best illustrated-in FIG. 4.

Figure 5:
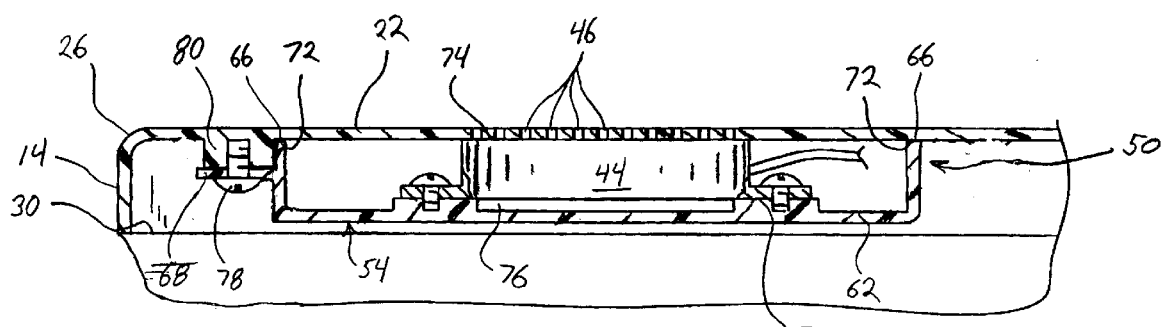
FIG. 5 is an inverted cross-sectional view taken generally along line 5—5 of FIG. 4.

In addition to adhering support member 54 to upper case 26, a plurality of fasteners 78 can be used to further secure the overall speaker box 50 to chassis 12. Exemplary fasteners include screws that are inserted through apertures 70 of appropriate fastener supports 68 and tightened in appropriate threaded bosses 80, as best illustrated in FIG. 5. The attachment of speaker box 50 to chassis 12, e.g. upper case 26, fully supports one or more speakers 44 while adding substantial structural rigidity to the overall chassis 12.

It will be understood that the foregoing description is of preferred embodiments of this invention, and that the invention is not limited to the specific forms shown. For example, the combined speakers and structural support can be applied to a variety of other portable electronic devices; one or more speakers may be utilized in a variety of arrangements; the configuration of the structural support member can be adapted according to the overall chassis design and location of internal components; and the structural support member can be made-of a variety of materials, such as plastics, metals or woods, that are able to increase the structural rigidity of the chassis. These and other modifications may be made in the design and arrangement of the elements without departing from the scope of the invention as expressed in the appended claims. With respect to the claims, it is the intention of the applicant not to invoke 35 U.S.C. §112, paragraph 6, for any limitations of any of the claims herein except for those in which the claim expressly uses the words "means for" together with an associated function.

What is claimed is:

1. A portable computer, comprising:

a chassis having a lower case and an upper case; the upper case having an upper wall with a plurality openings;

a keyboard connected to the chassis;

a speaker box secured to the upper case, the speaker box comprising a structural reinforcement member for the upper case and a speaker mounting area; and a speaker oriented to output sound through the plurality of openings, the speaker being mounted within the speaker mounting area.

2. The portable computer as recited in claim 1, when the speaker box is connected to the top case by an adhesive.

3. The portable computer as recited in claim 2, wherein the speaker box is connected to the top case by a plurality of threaded fasteners.

4. The portable computer as recited in claim 3, wherein the chassis includes a pair of generally parallel sides and the speaker box extends between the pair of generally parallel sides.

5. The portable computer as recited in claim 1, wherein the speaker comprises a pair of speakers.

6. The portable computer as recited in claim 1, wherein the chassis is a notebook computer chassis.

7. The portable computer as recited in claim 1, further comprising a display screen coupled to the chassis by a hinge, the keyboard being located generally between the speaker and the hinge.

8. A portable electronic device structure, comprising:

a chassis having a front, a rear, a first side extending between the front and the rear, and a second side extending between the front and the rear, wherein the chassis comprises a portable computer chassis having a lower case and a top case;

a reinforcement structure extending at least partially between the first side and the second side, the reinforcement structure being permanently attached to the chassis along one of the first side and the second side; and a speaker mounted to the reinforcement structure, wherein the reinforcement structure is connected to the top case.

9. The portable electronic device structure as recited in claim 8, wherein the reinforcement structure is connected to the top case by an adhesive.

10. The portable electronic device structure as recited in claim 9, wherein the reinforcement structure is connected to the top case by a plurality of threaded fasteners.

11. The portable electronic device structure as recited in claim 8, wherein the reinforcement structure is connected to the top case by a plurality of threaded fasteners.

12. The portable electronic device structure as recited in claim 8, wherein the reinforcement structure comprises a speaker box having a pair of speaker reception areas.

13. The portable electronic device structure as recited in claim 12, wherein the speaker comprises a pair of speakers.

14. The portable electronic device structure as recited in claim 8, wherein the chassis is a notebook computer chassis.

15. A method of reinforcing a portable computer having a chassis, comprising:

forming a structural reinforcement member with a speaker mounting area and a plurality of support arms extending from the speaker mounting area;

combining a speaker with the structural reinforcement member; and connecting the structural reinforcement member to an upper wall of the chassis to stiffen the chassis.

16. The method as recited in claim 15, further comprising mounting a keyboard to the chassis such that the keyboard is exposed to a user through the upper wall.

17. The method as recited in claim 16, further comprising positioning the structural reinforcement member between the keyboard and a front of the chassis.

18. The method as recited in claim 15, wherein connecting comprises adhering the structural reinforcement member to the upper wall.

19. The method as recited in claim 15, wherein connecting comprises attaching the structural reinforcement member to the upper wall by a plurality of screws.

20. The method as recited in claim 17, further comprising mounting a display screen to the chassis by a hinge disposed at a rear of the chassis.

21. The method as recited in claim 16, wherein combining comprises combining a pair of speakers with the structural reinforcement member.

22. The method as recited in claim 15, wherein connecting comprises connecting the structural reinforcement member along the chassis of a notebook computer.

23. The method as recited in claim 15, wherein connecting comprises fastening by a plurality of screws and adhering the structural reinforcement member to the chassis.

* * * * *